US012232625B2

(12) United States Patent
Park

(10) Patent No.: US 12,232,625 B2
(45) Date of Patent: Feb. 25, 2025

(54) EMBEDDED STORAGE SPACE STRUCTURE OF AIR MATTRESS HAVING A THREE-DIMENSIONAL FABRIC

(71) Applicant: Yang Sung Park, Seoul (KR)

(72) Inventor: Yang Sung Park, Seoul (KR)

(*) Notice: Subject to any disclaimer, the term of this patent is extended or adjusted under 35 U.S.C. 154(b) by 370 days.

(21) Appl. No.: 17/771,383

(22) PCT Filed: Nov. 13, 2020

(86) PCT No.: PCT/KR2020/016002
§ 371 (c)(1),
(2) Date: Apr. 22, 2022

(87) PCT Pub. No.: WO2021/101180
PCT Pub. Date: May 27, 2021

(65) Prior Publication Data
US 2022/0369826 A1 Nov. 24, 2022

(30) Foreign Application Priority Data
Nov. 19, 2019 (KR) .................. 10-2019-0148549

(51) Int. Cl.
A47C 27/00 (2006.01)
A47C 21/00 (2006.01)
(Continued)

(52) U.S. Cl.
CPC .......... A47C 27/002 (2013.01); A47C 21/003 (2013.01); A47C 27/081 (2013.01);
(Continued)

(58) Field of Classification Search
CPC ..... A47C 27/081; A47C 21/006; A47C 27/08; A47C 27/002; A47C 21/003; A47C 21/00; A47C 27/082; A47C 27/10; A47C 27/12; A47C 31/00; A61H 2201/0138; A61H 23/0236; A61H 2201/0142; A61H 2201/0149; Y10S 5/904; B32B 3/266; B32B 5/024; B32B 5/262; B32B 2255/02; B32B 2255/26; B32B 2601/00; H04R 1/028
(Continued)

(56) References Cited

FOREIGN PATENT DOCUMENTS

JP 2000-083766 A 3/2000
KR 100684071 B1 * 2/2007 ............ A47C 27/08
(Continued)

Primary Examiner — David R Hare
Assistant Examiner — Madison Emanski

(57) ABSTRACT

An embedded storage space structure of an air mattress made of a three-dimensional woven fabric maintaining an inflated state by an air pressure injected therein by forming a coating layer made of an elastomer that blocks air. A structure providing an independent space while maintaining a vibration characteristic of the pile yarn inside the air mattress is configured such that a barrel-shaped box and a cylinder-shaped isolated part are joined. The barrel-shaped box accommodates a plurality of electric components of a speaker and an air pump, and the cylinder-shaped isolated part connects between an upper and lower woven surfaces of the barrel-shaped box. Multiple coating films are respectively formed on the outer sides of the upper and lower woven surfaces of the barrel-shaped box.

3 Claims, 8 Drawing Sheets

(51) Int. Cl.
    *A47C 27/08*          (2006.01)
    *B32B 3/26*           (2006.01)
    *B32B 5/02*           (2006.01)
    *B32B 5/26*           (2006.01)

(52) U.S. Cl.
    CPC .............. *B32B 3/266* (2013.01); *B32B 5/024* (2013.01); *B32B 5/262* (2021.05); *B32B 2255/02* (2013.01); *B32B 2255/26* (2013.01); *B32B 2601/00* (2013.01)

(58) Field of Classification Search
    USPC ............ 381/301, 151, 333, 388; 5/411, 904; 601/47, 49
    See application file for complete search history.

(56) References Cited

FOREIGN PATENT DOCUMENTS

| | | | | |
|---|---|---|---|---|
| KR | 10-2008-0079954 A | 9/2008 | | |
| KR | 20080079954 A | * 9/2008 | .............. | H04R 1/00 |
| KR | 10-1442415 B1 | 9/2014 | | |
| KR | 10-1758025 B1 | 7/2017 | | |
| KR | 10-2018-0108170 B1 | 10/2018 | | |

* cited by examiner

EMBEDDED STORAGE SPACE STRUCTURE OF AIR MATTRESS HAVING A THREE-DIMENSIONAL FABRIC

TECHNICAL FIELD

The present invention relates to the embedded storage space structure of air mattressa having a three-dimensional woven fabric, and more particularly, to an embedded accommodation space structure of an air mattress made of three-dimensional woven fabrics, the structure providing, when an air mattress that has an airtightness-exhibiting coating layer, which is formed on the outer surface of the three-dimensional woven fabric woven from a plurality of pieces of pile yarn connecting the space between woven surfaces facing each other at both sides thereof, so as to be inflated by means of air pressure is manufactured, an independent space in which electric components such as a speaker for generating sound and vibration and an air pump for filling the mattress with air can be provided in a concealed state, so that the exposure of the electric components is blocked while maintaining sound transmission characteristics through the pile yarn, and thus convenience of use and exterior attractiveness can be increased.

BACKGROUND ART

Generally, in a tube type air mattress manufactured by vinyl, when an air is injected, the material is stretched to be deformed due to an expansion pressure to drop the air pressure so that it is inconvenient to frequently supplement the air to maintain a proper state of the air pressure. Further, even though an optimal air pressure is maintained, a response ability to uniformly support or distribute the weight is weakened, which causes the lack of the stability so that there was a problem in that it was very unsuitable in terms of the convenience for a long-time use, such as a bed.

In order to solve the problem of the air mattress made of vinyl, there was an air mattress made of three-dimensional woven fabrics in which a coating layer made of elastomer was formed on an outer surface of the three-dimensional woven fabrics from a plurality of pieces of file yarn connecting spaces between woven surfaces facing each other at both sides thereof so that when the air was injected, the plurality of pieces of file yarns connecting both woven surfaces integrally attached onto the coating layer maintained the solid air pressure in response to a load applied from the outside while maintaining a constant air pressure.

An air mattress in which the three-dimensional woven fabrics are used as a base has a high durability while maintaining a stable air pressure to be widely being used in various fields such as various amusement rides, camping, and sports goods including a sealed air layer.

Specifically, Korean Registered Patent No. 10-0684071 which is previously registered by the applicant of the present invention proposes an acoustic vibration system with a speaker for an air cushion product is proposed in order to replace a spring mattress used for a bed, after manufacturing an air mattress made of three-dimensional woven fabrics, a speaker of an audio device is attached on an outer surface to switch a sound spreading through the speaker into a vibration in proportion to an amplitude of the sound by means of a sealed air layer and a plurality of wires vertically connected to a space part to be applied to the entire mattress so that when a user lies on the cushion product, the user may feel the sound through the human body in contact with the cushion product while listening to the music.

That is, according to the pre-registered patent, as illustrated in FIGS. 1 and 2, when the air mattress 20 used for a bed 10 is manufactured, a three-dimensional woven fabric which is woven to vertically connect upper and lower woven surfaces 2 and 3 by a plurality of pieces of pile yarns is used as a base, and a coating layer formed of an elastomer which blocks the air is formed on an inner surface or an outer surface to achieve a durability and pressure resistance by an air pressure which is charged therein. In this state, a speaker 30 which reproduces and radiates an acoustic signal generated from an audio system 31 such as an audio or a video is mounted on an outer surface of the mattress 20. By doing this, the sound propagated from the speaker uniformly applies the vibration to an upper surface of the air mattress on which the human lies by means of a plurality of pile yarns therein to allow the human to sense the sound through the hearing and the body.

The acoustic vibration system with a speaker for an air mattress formed of a three-dimensional woven fabric has a structure in which after installing electronic components such as a speaker, an audio system, or an air pump which charges air to be exposed to the outside of the air mattress, a wire for transmitting an electric signal is provided or an air supply hose is connected. Therefore, in proportion to the types of the electric components, the number of electric components which are exposed to the outside of the air mattress is increased so that it is inconvenient to handle and use the mattress and the exterior attractiveness is degraded due to the electric components, the wires, and the hoses exposed to the outside.

Specifically, as illustrated in FIG. 2, when a speaker is installed on a bottom surface of the air mattress to efficiently spread the vibration by the sound, a separate space for accommodating the speaker needs to be prepared in a lower frame which supports the mattress so that it is inconvenience to manufacture the lower frame and an installation space for the speaker is extremely limited.

DISCLOSURE

Technical Problem

The present invention has been made an effort to solve the problem of the related art caused when the speaker is installed to be exposed to the outside of the air mattress as described above and an object is to provide the embedded storage space structure of air mattressa having a three-dimensional woven fabric which forms a separate structure including an independent space in which electric components such as a speaker for generating a vibration by a sound and an air pump are provided in a concealed state while maintaining a sound transmitting characteristics through the pile yarns so that the electric components are not exposed to the outside of the mattress to increase the convenience of use and exterior attractiveness.

Technical Solution

In order to achieve the above-mentioned object, the present invention provides: a structure for providing the independent space while maintaining the vibration characteristics of the pile yarn, inside an air mattress which maintains an inflating state by an air pressure injected therein by forming a coating layer which blocks air on an outer surface of three-dimensional woven fabrics vertically connecting a plurality of pieces of pile yarn between upper and lower woven surfaces facing each other as a base, in which a barrel-shaped box, of which the upper part is blocked by a flange formed on an outer peripheral surface of an opening so that the electric components such as a speaker for transmitting sound and an air pump for injecting air are selectively accommodated therein through the opening provided at the bottom surface thereof, and a cylinder-shaped isolated part, of which the side is opened in a state in which the plurality of pieces of pile yarn is woven above the box so as to be vertically connected between upper and lower woven surfaces and coating films are respectively formed on the outer sides of the upper and lower woven surfaces, are integrally joined therein.

Advantageous Effects

According to the embedded storage space structure of air mattressa having a three-dimensional woven fabric of the present invention, after inserting and joining the structure including a laminated box and an isolated part into a circular hole formed to pass through a lower surface of the air mattress or vertically pass the air mattress using a three-dimensional woven fabric as a base, the electric components such as a speaker, an audio system, or an air pump are inserted through the opening of the box, and then the opening is blocked with the cover so that the electric components are installed in a concealed state so as not to be exposed to the outside of the air mattress to improve the exterior attractiveness. Further, an entire part of the air mattress maintains an inflating state for a long time while maintaining a uniform pressure to increase the usage convenience and the vibration of the speaker installed in the box may spread through the pile yarn of the isolated part which configures the structure.

BEST MODE FOR CARRYING OUT THE INVENTION

Figure 1:
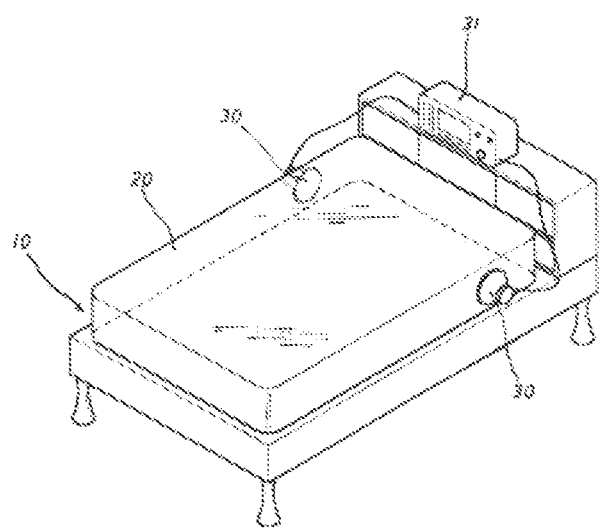
FIGS. 1 and 2 are a perspective view and a partial cross-sectional view illustrating an acoustic vibration system with a speaker of an air cushion product formed of a three-dimensional woven fabric of the related art.
Figure 2:
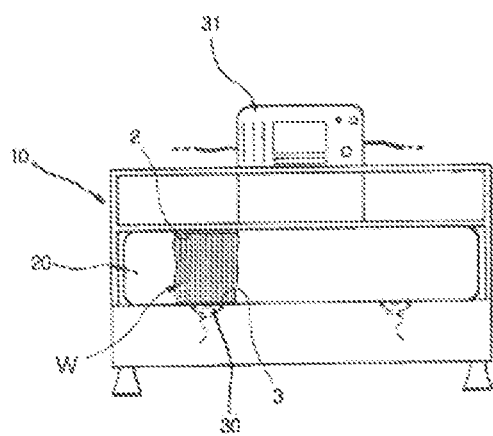
Figure 3:
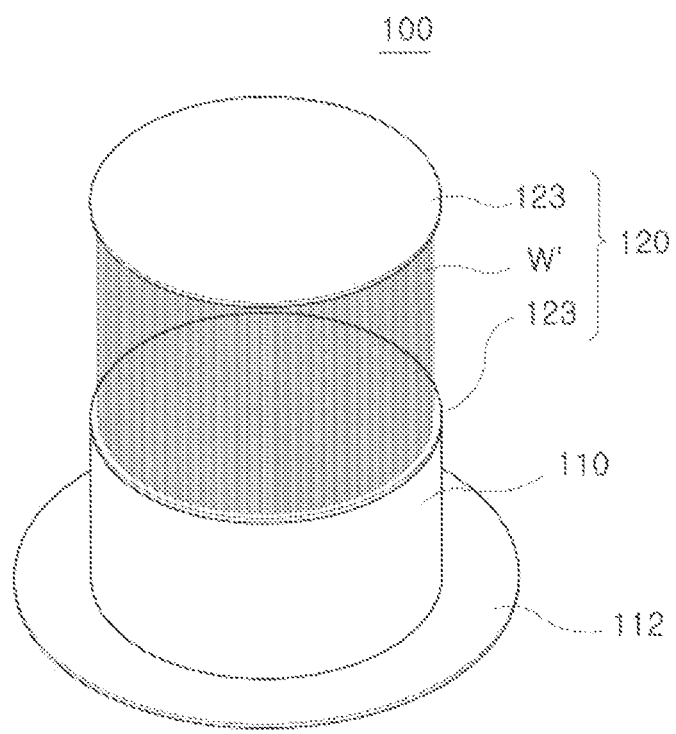
FIGS. 3 and 4 are a perspective view and a cross-sectional view illustrating an accommodation space structure formed in an air mattress made of three-dimensional woven fabrics of the present invention.
Figure 4:
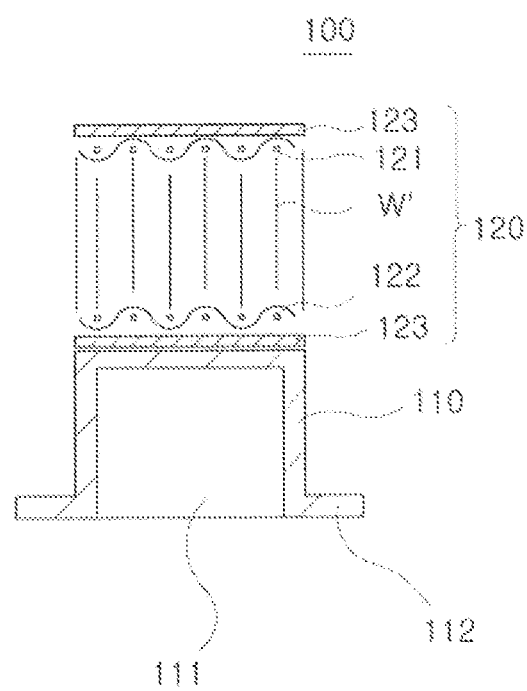
Figure 5:
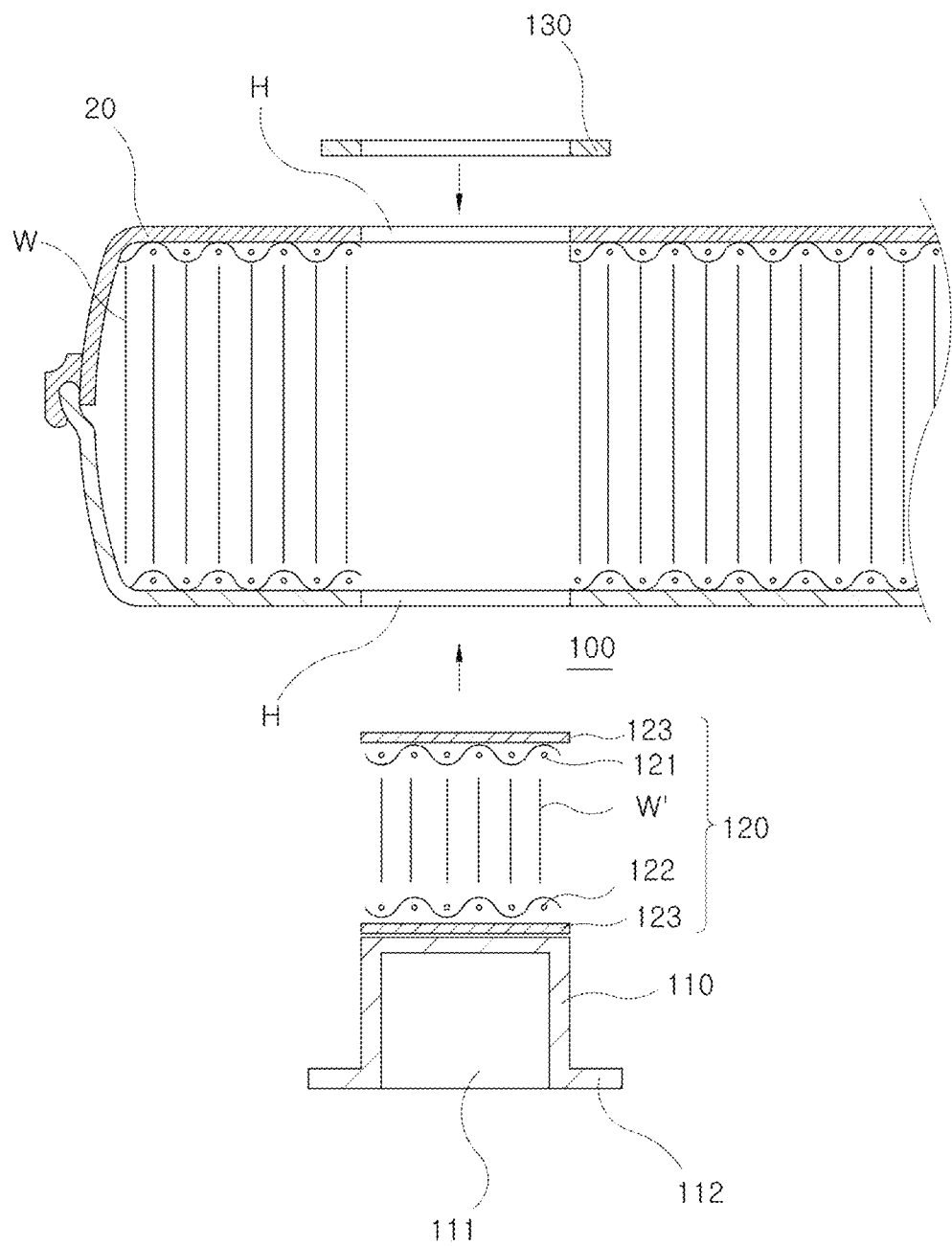
FIGS. 5 and 6 are cross-sectional views of an exemplary embodiment illustrating states before and after installing an accommodation space structure in an air mattress with the three-dimensional woven fabrics.
Figure 6:
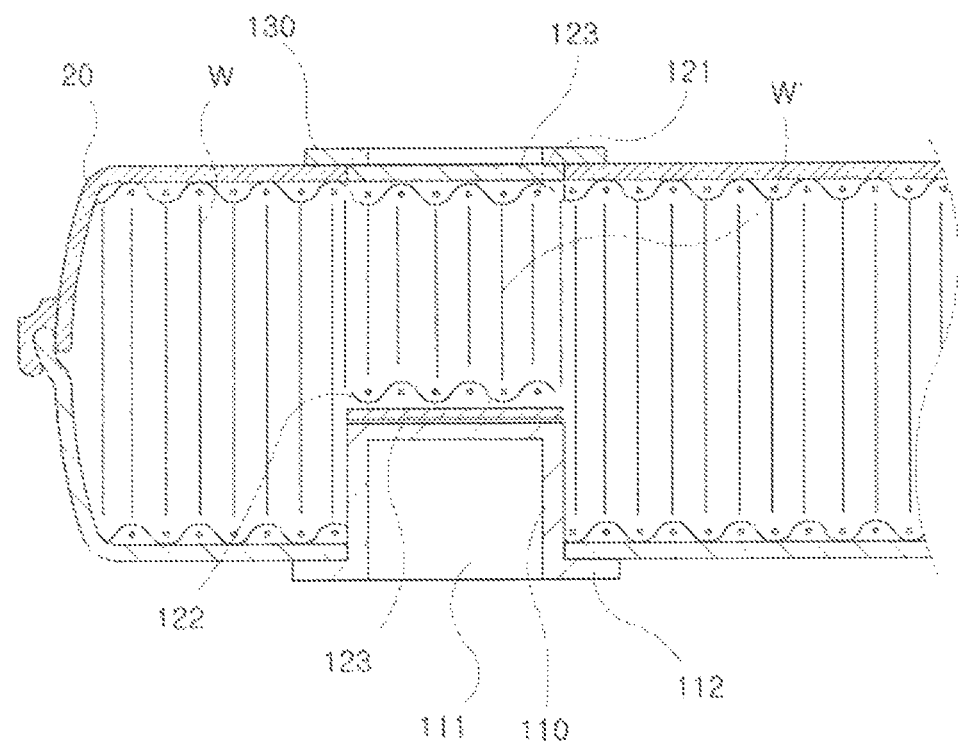

Hereinafter, the embedded storage space structure of air mattressa having a three-dimensional woven fabric of the present invention will be described with reference to the accompanying drawings as follows:

FIGS. 3 and 4 are a perspective view and a cross-sectional view illustrating an accommodation space structure of the present invention and FIGS. 5 and 6 are cross-sectional views of an exemplary embodiment illustrating states before and after installing an accommodation space structure in an air mattress with the three-dimensional woven fabrics. The present invention relates to a structure 100 which provides an independent space while maintaining a vibration characteristic of pile yarn on the premise of the air mattress 20 which maintains an inflated state by an air pressure injected therein by forming a coating layer made of elastomer which blocks air on an outer surface by using three-dimensional woven fabrics in which a plurality of pile yarns W is vertically connected between upper and lower woven surfaces 2 and 3 facing each other as a base.

In the structure 100, a barrel-shaped box 100, of which the upper part is blocked by a flange 112 formed on the outer peripheral surface of an opening so that the electric components such as the speaker for transmitting sound and the air pump for injecting air are selectively accommodated therein through the opening 111 provided at the bottom surface thereof, and a cylinder-shaped isolated part 120, of which the side is opened in a state in which the plurality of pieces of pile yarn W' is woven above the box to be vertically connected between the upper and lower woven surfaces 121 and 122 and coating films 123 made of elastomer are respectively formed on the outer sides of the upper and lower woven surfaces 121 and 122, similarly to the three-dimensional woven fabrics which are used as a base of the air mattress 20, are integrally joined.

When the structure 100 is manufactured such that the isolated part 120 configured by the three-dimensional woven fabrics is joined to an upper surface of the box 110, the box 110 and the isolated part 120 have the same external diameter and upper and lower parts those of have the ratio in the same range and the remaining part excluding the flange 112 formed at a lower end of the box 110 is preferably formed to have the same height as the air mattress 20.

When the structure 100 of the present invention is installed to be inserted to be concealed in the air mattress 20, as illustrated in FIG. 5, after forming a circular hole H having the same internal diameter to vertically pass through any one or more parts of the air mattress so that the box 110 and the isolated part 120 are inserted, the structure 100 is inserted upwardly from the lower part.

That is, when the structure 100 is inserted into the hole H formed in the air mattress 20, as illustrated in FIG. 6, the flange 112 at a lower end of the box 110 is closely joined to the outer surface of the hole H at a lower side and in a state in which a circular coating layer 123 formed on the upper surface of the isolated part 120 is located on the same line while entering onto an inner peripheral surface of the hole H of the air mattress 20 at an upper side, the coating layer 123 and a donut shaped joint material 130 which integrates a part of the air mattress 20 are in contact with each other on both sides of the hole H to be joined.

Since the coating layer 123 which configures the structure 100 and a surface coating layer and the joint material 130 of the air mattress 20 are manufactured by the same type of elastomer, thermal bonding is desirably used to increase the durability, but an adhesive may also be used.

Figure 7:
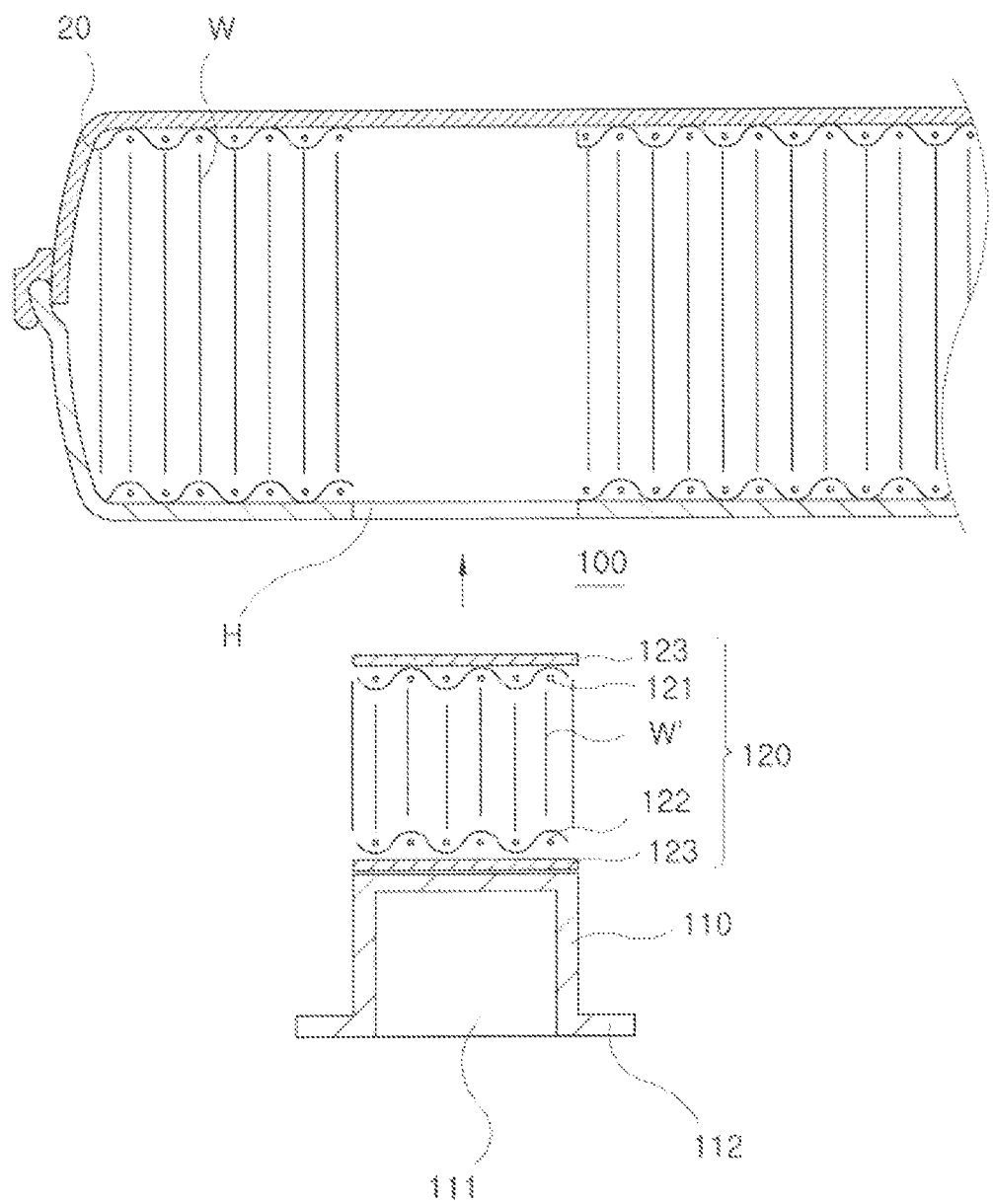
FIGS. 7 and 8 are cross-sectional views of another exemplary embodiment illustrating states before and after installing an accommodation space structure in an air mattress with the three-dimensional woven fabrics.
Figure 8:
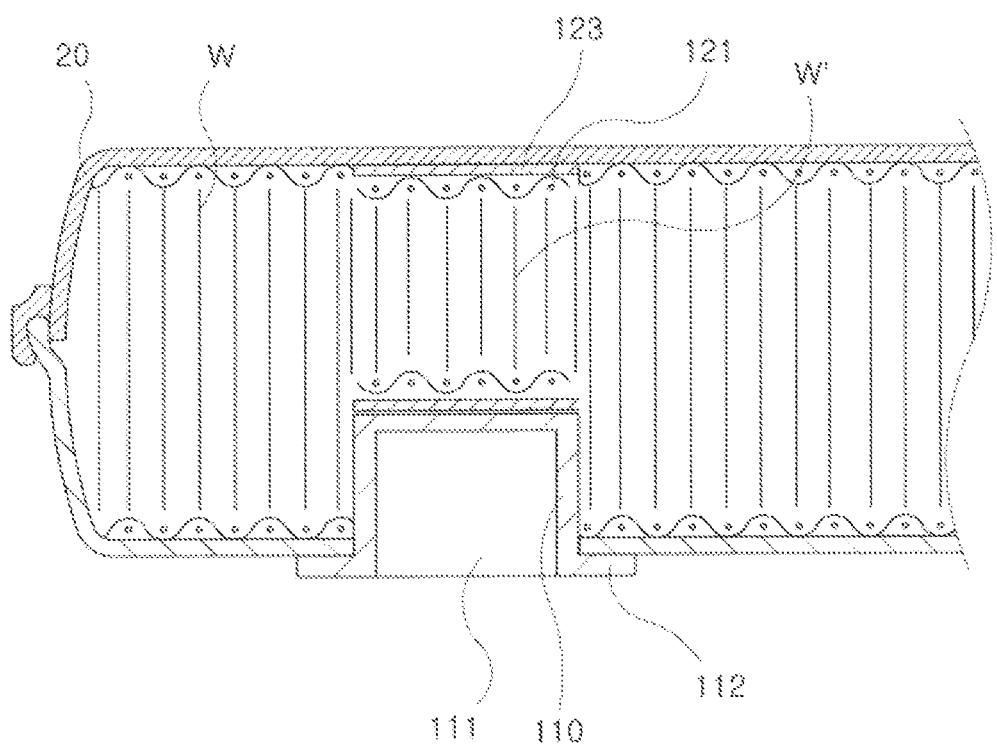

FIGS. 7 and 8 are cross-sectional views of another exemplary embodiment illustrating states before and after installing an accommodation space structure in an air mattress with the three-dimensional woven fabrics. In the embodiment of FIGS. 5 and 6, the circular hole H is formed to vertically pass through the air mattress 20 to allow the structure 100 to be inserted therein. However, according to another embodiment of the present invention, after forming a circular hole H on a lower surface of the air mattress 20, the structure 100 is inserted in a state in which the pile warn W remaining in the hole is removed so that the coating layer 123 at the upper side and an inner surface of the air mattress 20 are in contact with each other.

Figure 9:
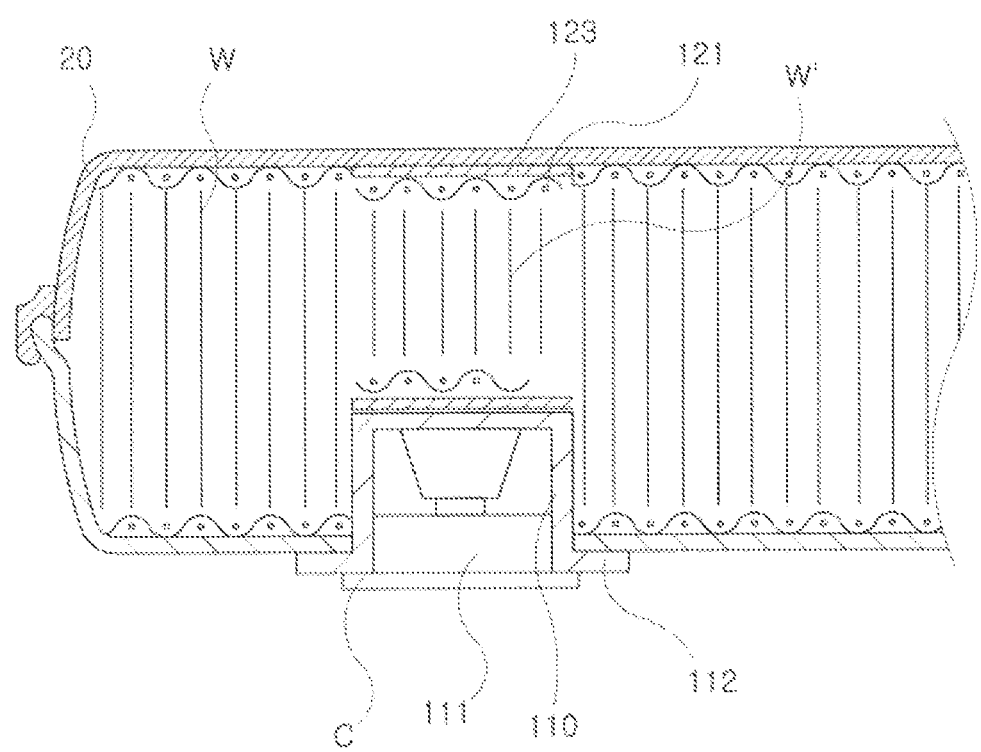
FIG. 9 is a cross-sectional view illustrating an example that an electric component is mounted in an accommodation space structure installed in an air mattress of the present invention.

FIG. 9 is a cross-sectional view illustrating an example that an electric component is mounted in an accommodation space structure installed in an air mattress of the present invention. After inserting and joining the structure 100 including the laminated box 110 and the isolated part 120 into the circular hole H which is formed to pass through a lower surface of the air mattress 20 or vertically pass through the air mattress 20, the electric components such as a speaker, an audio system, or an air pump are inserted through the opening 111 of the box 110, and then the opening is blocked by the cover C so that the electric components may be provided in a concealed state so as not to be exposed to the outside of the air mattress. Simultaneously, the entire part of the air mattress may be maintained in an inflated state for a long time while maintaining a uniform pressure so that the usage convenience may be improved.

Even though a length of the pile yarn W' of the isolated part 120 which configures the structure 100 is slightly shorter than a length of the pile yarn W which configures the air mattress 20, it was confirmed through repeated experiments that there is no problem in spreading the vibration generated by the sound of the speaker installed in the box 110.

The invention claimed is:

1. An embedded storage space structure of an air mattress made of a three-dimensional woven fabric which maintains an inflated state by an air pressure injected therein by forming a coating layer made of an elastomer which blocks air on an outer surface of the three-dimensional woven fabric vertically connecting a plurality of pieces of pile yarn between an upper woven surface and a lower woven surface facing each other, wherein a structure which provides an independent space while maintaining a vibration characteristic of the pile yarn inside the air mattress is configured such that a barrel-shaped box, of which an upper part is blocked by a flange formed on an outer peripheral surface of an opening so that a plurality of electric components of a speaker for transmitting sound and an air pump for injecting air are selectively accommodated therein through the opening provided at a bottom surface thereof, and a cylinder-shaped isolated part, of which a side is opened in a state in which the plurality of pieces of pile yarn is woven above the barrel-shaped box so as to be vertically connected between an upper and lower woven surfaces of the barrel-shaped box and a plurality of coating films are respectively formed on the outer sides of the upper and lower woven surfaces of the barrel-shaped box, are integrally joined therein.

2. The embedded storage space structure of the air mattress having the three-dimensional woven fabric of claim 1, wherein when the structure is manufactured such that the cylinder-shaped isolated part configured by the three-dimensional woven fabric is joined to an upper surface of the barrel-shaped box, the barrel-shaped box and the isolated part have a same external diameter, and upper and lower parts thereof have a ratio in the same range and a remaining part excluding the flange formed at a lower end of the box is formed to have a same height as the air mattress.

3. The embedded storage space structure of the air mattress having the three-dimensional woven fabric of claim 1, wherein after forming a circular hole having a same internal diameter in any one or more parts selected from the air mattress to vertically pass through the air mattress so that the barrel-shaped box and the cylinder-shaped isolated part are inserted, the structure is inserted upwardly from the lower part of the circular hole, the flange at a lower end of the barrel-shaped box is closely attached onto the outer surface of the circular hole at a lower side, and in a state in which a circular coating layer formed on the upper woven surface of the isolated part is located on a same line while entering onto an inner peripheral surface of the circular hole of the air mattress at an upper side, the circular coating layer and a donut shaped joint material which integrates a part of the air mattress are in contact with each other on both sides of the circular hole to be joined.

\* \* \* \* \*